United States Patent
Laffey

(10) Patent No.: US 12,418,423 B2
(45) Date of Patent: Sep. 16, 2025

(54) BINDING A VIRTUAL SECURITY PROCESSOR TO A PHYSICAL SECURITY PROCESSOR

(71) Applicant: HEWLETT PACKARD ENTERPRISE DEVELOPMENT LP, Spring, TX (US)

(72) Inventor: Thomas M. Laffey, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 81 days.

(21) Appl. No.: 18/583,323

(22) Filed: Feb. 21, 2024

(65) Prior Publication Data

US 2024/0348457 A1 Oct. 17, 2024

Related U.S. Application Data

(60) Provisional application No. 63/495,382, filed on Apr. 11, 2023.

(51) Int. Cl.
*H04L 9/32* (2006.01)
*H04L 9/08* (2006.01)

(52) U.S. Cl.
CPC .......... *H04L 9/3263* (2013.01); *H04L 9/0869* (2013.01)

(58) Field of Classification Search
CPC .............................. H04L 9/3263; H04L 9/0869
See application file for complete search history.

(56) References Cited

U.S. PATENT DOCUMENTS

| | | | | |
|---|---|---|---|---|
| 5,361,062 A | * | 11/1994 | Weiss ................. | G06Q 20/4012 705/72 |
| 6,088,510 A | * | 7/2000 | Sims ...................... | G06N 3/126 706/13 |
| 6,895,504 B1 | * | 5/2005 | Zhang .............. | H04N 21/42684 348/E7.063 |
| 8,341,717 B1 | * | 12/2012 | Delker .................... | H04L 63/20 705/56 |
| 8,385,384 B1 | * | 2/2013 | Kidder .................... | H04W 4/06 375/133 |
| 9,003,513 B1 | * | 4/2015 | Houtchens ............ | G06F 1/3206 726/16 |

(Continued)

OTHER PUBLICATIONS

D'Netto et al., "The Trusted Platform Module Key Hierarchy", Jan. 4, 2021 (14 pages).

(Continued)

*Primary Examiner* — Aravind K Moorthy
(74) *Attorney, Agent, or Firm* — Trop, Pruner & Hu, P.C.

(57) ABSTRACT

In some examples, a virtual manager in an electronic device generates a seed based on a first key stored in a physical security processor of the electronic device. The virtual manager initializes a virtual security processor by providing the seed to the virtual security processor. The electronic device creates, in the virtual security processor, a virtual security processor key based on the seed, and a virtual security processor certificate based on the virtual security processor key. The virtual security processor key is bound to the physical security processor based on the virtual security processor key being generated from the first key stored in the physical security processor. An identity of a virtual entity in the electronic device is included in the virtual security processor certificate.

20 Claims, 5 Drawing Sheets

(56) References Cited

U.S. PATENT DOCUMENTS

| | | | | |
|---|---|---|---|---|
| 10,079,812 | B1* | 9/2018 | Thadishetty | H04L 67/06 |
| 11,397,823 | B1* | 7/2022 | Argenti | G06F 21/64 |
| 11,475,726 | B1* | 10/2022 | Cook | H04L 9/0894 |
| 11,943,215 | B1* | 3/2024 | Nair | H04L 9/3226 |
| 12,341,762 | B2* | 6/2025 | Brockmann | G06F 21/10 |
| 12,341,879 | B2* | 6/2025 | Takahashi | H04L 9/0855 |
| 2003/0028768 | A1* | 2/2003 | Leon | H04L 63/0815 713/180 |
| 2003/0196111 | A1* | 10/2003 | Lampson | G06F 21/575 713/1 |
| 2003/0226040 | A1* | 12/2003 | Challener | G06F 21/78 713/193 |
| 2005/0166024 | A1* | 7/2005 | Angelo | G06F 21/575 711/164 |
| 2005/0246552 | A1* | 11/2005 | Bade | G06F 21/57 713/193 |
| 2005/0257271 | A1* | 11/2005 | Lafornara | H04L 63/0823 726/26 |
| 2006/0053302 | A1* | 3/2006 | Yasaki | H04L 9/0897 713/176 |
| 2007/0110245 | A1* | 5/2007 | Sood | H04L 9/0844 380/270 |
| 2007/0168048 | A1* | 7/2007 | Allen | G06F 21/74 700/2 |
| 2008/0072039 | A1* | 3/2008 | Relyea | H04L 9/3263 713/158 |
| 2008/0244569 | A1* | 10/2008 | Challener | G06F 9/45558 718/1 |
| 2009/0070598 | A1* | 3/2009 | Cromer | G06F 21/575 713/193 |
| 2009/0249080 | A1* | 10/2009 | Zhang | G06F 21/76 380/278 |
| 2010/0005311 | A1* | 1/2010 | Okamoto | H04L 9/3247 713/176 |
| 2010/0296651 | A1* | 11/2010 | Tkacik | H04L 9/088 380/44 |
| 2010/0313056 | A1* | 12/2010 | Margolis | G06F 21/57 713/400 |
| 2012/0151199 | A1* | 6/2012 | Shriver | G06F 21/575 713/193 |
| 2012/0205451 | A1* | 8/2012 | Poidomani | G06K 19/077 235/492 |
| 2014/0173274 | A1* | 6/2014 | Chen | G06F 21/64 713/155 |
| 2014/0258594 | A1* | 9/2014 | Kozlosk | H04L 9/0869 711/103 |
| 2014/0281574 | A1* | 9/2014 | Webb | H04L 9/0863 713/189 |
| 2014/0282935 | A1* | 9/2014 | Lal | G06F 21/72 726/6 |
| 2015/0063565 | A1* | 3/2015 | Ansari | G06F 12/1408 380/44 |
| 2015/0078550 | A1* | 3/2015 | Ferguson | H04L 9/0861 380/44 |
| 2015/0363607 | A1* | 12/2015 | Yang | H04L 9/085 713/165 |
| 2016/0048397 | A1* | 2/2016 | Morales | H04W 12/02 713/2 |
| 2016/0087797 | A1* | 3/2016 | Barbir | H04L 9/3226 713/171 |
| 2016/0147996 | A1* | 5/2016 | Martinez | H04L 9/0877 713/171 |
| 2016/0285631 | A1* | 9/2016 | Deleeuw | H04L 67/1001 |
| 2017/0155512 | A1* | 6/2017 | Ogura | H04L 9/3273 |
| 2017/0155513 | A1* | 6/2017 | Acar | G06Q 20/20 |
| 2017/0244568 | A1* | 8/2017 | Brickell | H04W 12/041 |
| 2017/0357496 | A1* | 12/2017 | Smith | H04L 9/0662 |
| 2018/0026969 | A1* | 1/2018 | Newton | G03G 15/0863 713/176 |
| 2018/0287793 | A1* | 10/2018 | Khatib Zadeh | G11C 13/0004 |
| 2018/0316499 | A1* | 11/2018 | Choi | G06F 21/755 |
| 2018/0373881 | A1* | 12/2018 | Thom | H04L 9/0643 |
| 2019/0045354 | A1* | 2/2019 | Polehn | H04B 1/3816 |
| 2019/0305943 | A1* | 10/2019 | Hoersten | H04L 9/14 |
| 2019/0325140 | A1* | 10/2019 | Alon | H04L 9/3234 |
| 2019/0342397 | A1* | 11/2019 | Laibson | H04L 9/0894 |
| 2020/0014538 | A1* | 1/2020 | Liu | H04L 9/3231 |
| 2021/0243030 | A1* | 8/2021 | Robison | H04L 9/0877 |
| 2021/0374269 | A1* | 12/2021 | Alameh | G06F 21/6227 |
| 2022/0038274 | A1* | 2/2022 | Kannan | H04L 9/0825 |
| 2022/0100862 | A1* | 3/2022 | Vetter | G06F 21/575 |
| 2022/0141011 | A1* | 5/2022 | Kaplan | G06F 7/588 380/44 |
| 2022/0141015 | A1* | 5/2022 | Fong | H04L 9/14 713/171 |
| 2022/0197598 | A1* | 6/2022 | Tamiya | G06F 7/582 |
| 2022/0216991 | A1* | 7/2022 | Cain, Jr. | H04L 9/3247 |
| 2022/0270725 | A1* | 8/2022 | DeRosa-Grund | G06F 16/2365 |
| 2022/0321361 | A1* | 10/2022 | Ruan | H04L 9/0866 |
| 2022/0382887 | A1* | 12/2022 | Samuel | G06F 21/604 |
| 2022/0385456 | A1* | 12/2022 | Katiyar | H04L 9/0825 |
| 2022/0400383 | A1* | 12/2022 | Fong | H04W 12/0471 |
| 2022/0417240 | A1* | 12/2022 | Zhang | H04L 41/0895 |
| 2023/0008885 | A1* | 1/2023 | Khatri | G06F 21/602 |
| 2023/0038466 | A1* | 2/2023 | Tulsyan | H04L 63/1416 |
| 2023/0068972 | A1* | 3/2023 | Jiang | H04L 9/0825 |
| 2023/0074886 | A1* | 3/2023 | Armleder | G06F 21/64 |
| 2023/0083083 | A1* | 3/2023 | Bradbury | G06F 21/53 726/26 |
| 2023/0101566 | A1* | 3/2023 | Sambandan | H04W 8/186 370/329 |
| 2023/0103736 | A1* | 4/2023 | Liu | H04L 9/0825 713/171 |
| 2023/0116751 | A1* | 4/2023 | Chien | H04L 9/3268 713/156 |
| 2023/0119361 | A1* | 4/2023 | Chritz | H04L 9/3268 713/171 |
| 2023/0124136 | A1* | 4/2023 | Verma | H04L 63/0823 726/12 |
| 2023/0147815 | A1* | 5/2023 | Cho | H04L 63/123 713/168 |
| 2023/0254137 | A1* | 8/2023 | Liu | H04L 9/0844 380/44 |
| 2023/0315463 | A1* | 10/2023 | Pierson | G06F 9/30145 712/210 |
| 2023/0353391 | A1* | 11/2023 | Dover | H04L 9/3268 |
| 2023/0362162 | A1* | 11/2023 | Khare | H04L 63/0807 |
| 2023/0379142 | A1* | 11/2023 | Hong | H04L 9/0894 |
| 2024/0073035 | A1* | 2/2024 | Liu | H04L 9/3263 |
| 2024/0073037 | A1* | 2/2024 | McFarland, Jr. | H04L 9/50 |
| 2024/0086550 | A1* | 3/2024 | Tamir | G06F 21/602 |
| 2024/0089095 | A1* | 3/2024 | Tseng | H04L 9/0618 |
| 2024/0146536 | A1* | 5/2024 | Das | H04L 9/3213 |
| 2024/0211213 | A1* | 6/2024 | Banerjee | G06F 7/58 |
| 2024/0211294 | A1* | 6/2024 | Vandrovec | H04L 9/0897 |
| 2024/0305458 | A1* | 9/2024 | Boirun | H04L 9/3073 |
| 2024/0333695 | A1* | 10/2024 | Stolbikov | H04L 9/3263 |

OTHER PUBLICATIONS

TCG, "TPM 2.0 Keys for Device Identity and Attestation", Sep. 17, 2020, 68 pages.

TCG, "Trusted Platform Module Library", Part 1: Architecture, Nov. 8, 2019, 306 pages.

TCG, "Trusted Platform Module Library", Part 2: Structures, Nov. 8, 2019, 177 pages.

TCG, Trusted Platform Module Library, Part 3: Commands, Nov. 8, 2019, 432 pages.

Turner et al., "TPM Key Attestation", May 17, 2023, 15 pages.

Vmware, "Virtual Trusted Platform Module Overview", Jul. 14, 2022, 3 pages.

Wang et al., "SvTPM: A Secure and Efficient vTPM in the Cloud", May 2019, 13 pages.

* cited by examiner

BINDING A VIRTUAL SECURITY PROCESSOR TO A PHYSICAL SECURITY PROCESSOR

CROSS-REFERENCE TO RELATED APPLICATION

This claims the benefit under 35 U.S.C. § 119(e) of U.S. Provisional Application No. 63/495,382, filed Apr. 11, 2023, which is hereby incorporated by reference.

BACKGROUND

Electronic devices can be subjected to attacks by unauthorized entities, including humans, programs, or machines. To protect against such attacks, electronic devices can include mechanisms that apply security functions to ensure that entities performing operations in or with the electronic devices are authorized to perform such operations.

BRIEF DESCRIPTION OF THE DRAWINGS

Some implementations of the present disclosure are described with respect to the following figures.

Figure 1:
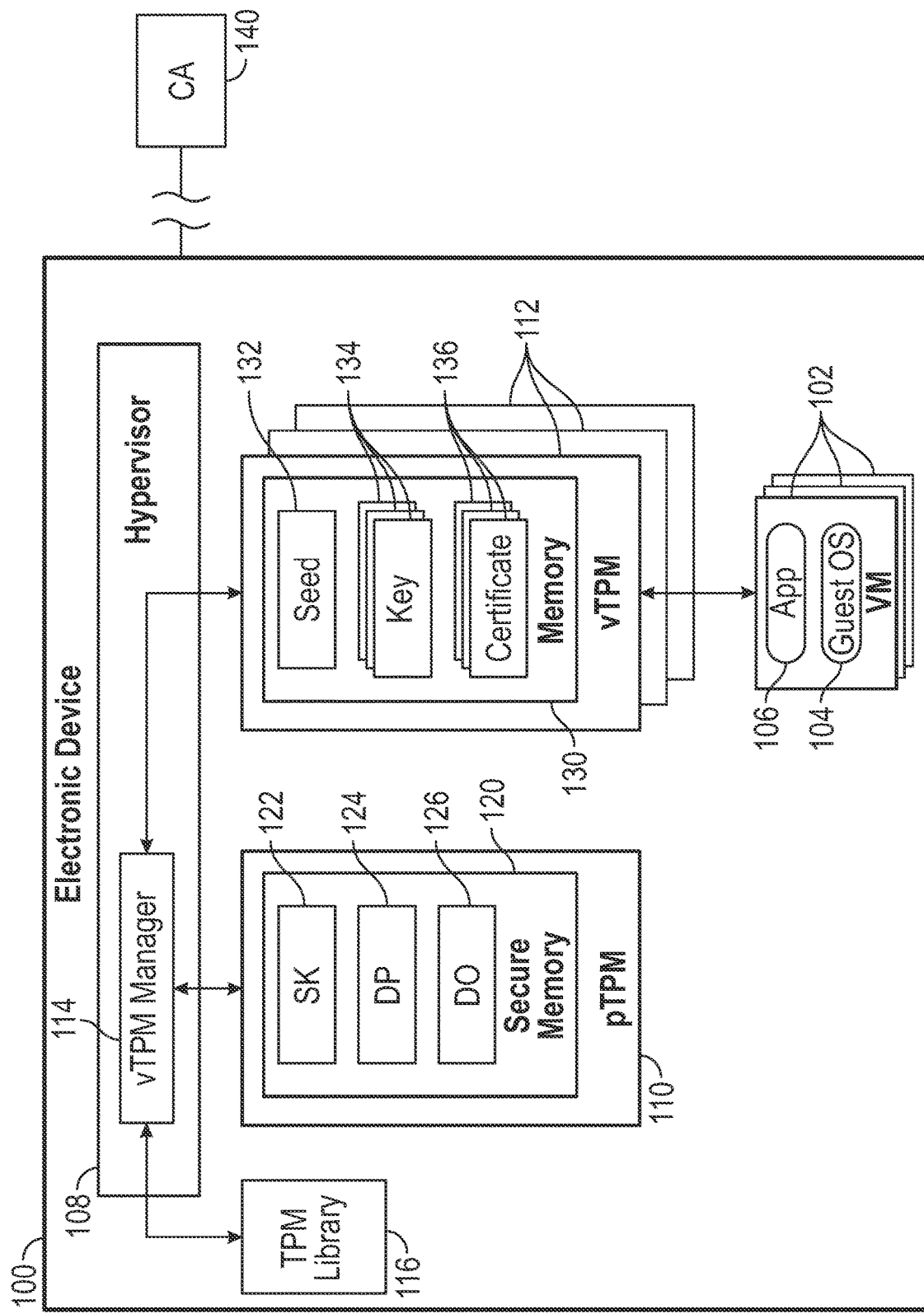
FIG. 1 is a block diagram of the electronic device including a virtual trusted platform module (vTPM) manager, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, a security mechanism in an electronic device can include a trusted platform module (TPM). A TPM is an example of a security processor (also referred to as a security cryptoprocessor) that can perform various hardware-based, security functionalities. In an electronic device that implements a virtualized computing environment, the electronic device can include a physical TPM (pTPM) as well as one or more virtual TPMs (vTPMs). A vTPM implements security functions for a virtual entity, such as a virtual machine (VM), a container, or any other type of virtual entity.

Security functions of a TPM (a pTPM or a vTPM) can include key management and generation to generate cryptographic keys used in security operations. In an electronic device that includes both a pTPM and a vTPM, a cryptographic key generated by a pTPM may be provided to a vTPM. However, once the key is provided to the vTPM, the key may be subject to unauthorized access because the vTPM, implemented using machine-readable instructions, may not have as strong a security protection as the pTPM. Further, the vTPM may be migrated from a source electronic device to a destination electronic device. Migration of the vTPM to the destination electronic device means that the pTPM of the source electronic device would no longer be able to control use of the key at the vTPM in the destination electronic device. Moreover, if the destination electronic device to which the vTPM is migrated has weaker security measures than the source electronic device, that further increases the likelihood of unauthorized access of the key that has been provided to the vTPM.

In some examples, an electronic device may implement positive control of the use of the key after the key is available to the vTPM. One way to control use of a key is to allow for key revocation after the key is provided to the vTPM. If the key is revoked, then the vTPM may no longer be able to use the key. However, the ability to revoke a key may still not prevent unauthorized access of the key if the vTPM is compromised, or if the vTPM were migrated to a different electronic device.

In accordance with some implementations of the present disclosure, techniques or mechanisms are provided to bind a virtual security processor (e.g., a vTPM) to a physical security processor (e.g., a pTPM), by using a virtual manager with access to the physical security processor to generate a seed based on a key (e.g., a storage key or any other root key) of the physical security processor. The generated seed can be a seed of a control domain hierarchy of the virtual security processor. For example, the control domain hierarchy can be an endorsement hierarchy, a platform hierarchy, or a storage hierarchy of a TPM. The virtual manager uses the seed to initialize a virtual security processor. The initialization of the virtual security processor includes providing the seed to the virtual security processor and generating virtual security processor keys and key certificates. An identity certificate derived using the virtual security processor can be used to identify a virtual entity (e.g., a VM or a container). The identity certificate can include an identity of the virtual entity. Examples of the identity certificate include a virtual IDevID certificate and a local IDevID (LDevID) certificate, discussed further below.

In some examples, a pTPM and a vTPM as discussed herein may operate according to the TPM 2.0 Specification from the Trusted Computing Group (TCG). Although the present discussion refers to TPMs as examples of security processors, in other examples, other types of security processors can be used. In addition to generation of keys and key certificates, examples of other security functionalities that can be performed by a TPM or other types of security processors can include any or some combination of the following: cryptographic computations, including applying cryptographic hash functions on information to derive hash values; secure storage of keys and other secret information; random number generation to generate random numbers; integrity measurement that generates or stores a measurement value provided by a target (where a target can include machine-readable instructions, a hardware component, or configuration information); or other security functionalities. Although a specific list of example security functionalities is provided above, in other examples, security processors can perform additional or alternative security functionalities.

A "key" refers to a value (e.g., a numerical value, an alphanumeric value, or any other value) that is used to encrypt or decrypt data. A "key" can refer to a key pair that includes a public key and a private key, where the public key is used to encrypt data and the private key is used to decrypt data encrypted with the public key.

A "certificate" (also referred to as a "digital certificate") refers to information (e.g., a file or another object) that is used to prove the authenticity of a user, a program, or a device. A certificate may be an X.509 certificate that is according to the X.509 Public Key Infrastructure (PKI) standard. A certificate can include information about an entity (e.g., a user, a program, or a device), and is issued by a trusted third party, which is referred to as a certificate authority (CA). A "key certificate" refers to a certificate that is associated with a key and a signature of the CA binds the key to an identity (and other information) contained in the certificate.

FIG. 1 is a block diagram of an electronic device 100 that includes virtual entities, which in FIG. 1 include virtual machines (VMs) 102. A VM refers to a virtualized computing environment that emulates a physical computing environment. A guest operating system (OS) 104 and one or more application programs 106 can execute in a VM 102. Examples of electronic devices can include any or some combination of the following: computers (e.g., desktop computers, notebook computers, server computers, tablet computers, etc.), smartphones, game appliances, household appliances, Internet of Things (IoT) devices, vehicles, or other types of electronic devices.

In other examples, other virtual entities executable in the electronic device 100 can include containers, which are isolated computing environments in which application programs can execute.

In examples where VMs 102 are executed in the electronic device 100, a hypervisor 108 is also present in the electronic device 100. A hypervisor is also referred to as a virtual machine monitor (VMM), and is implemented with machine-readable instructions. The hypervisor 108 creates and controls execution of the VMs 102. The hypervisor 108 is also responsible for presenting emulated instances of physical resources (e.g., processing resources, storage resources, communication resources, or other resources) of the electronic device 100 to each of the VMs 102.

More generally, the hypervisor 108 is an example of a virtualization management program that runs on the electronic device 100. Another example of a virtualization management program is a container engine (also referred to as a "container host" or a "container runtime engine") that can start and manage containers in the electronic device 100.

The ensuing refers to some examples that employ VMs. Note that techniques or mechanisms according to some examples of the present disclosure may be applied with other types of virtual entities, such as containers.

The electronic device 100 includes a pTPM 110, and one or more vTPMs 112 that can be instantiated based on the pTPM 110. A vTPM 112 can be employed by one or more associated VMs 102 to perform security functionalities.

Although FIG. 1 depicts TPMs (the pTPM 110 and one or more vTPMs 112), more generally, the electronic device 100 may include a physical security processor and one or more virtual security processors instantiated based on the physical security processor. Instantiating a virtual security processor on a physical security processor refers to producing various values (including keys and key certificates) of the virtual security processor based on a value in the physical security processor.

Instantiating a virtual security processor (e.g., a vTPM) based on a physical security processor (e.g., a pTPM) binds the virtual security processor to the physical security processor, such that various keys produced for the virtual security processor cannot be moved to a different electronic device. The virtualization management program (e.g., the hypervisor 108 or a container engine) can prevent the virtual security processor from persisting the keys produced for the virtual security processor. In other words, the keys produced for the virtual security processor are stored in volatile memory (or more specifically, virtual volatile memory). Keys stored in a virtual volatile memory cannot be saved to a persistent storage in unencrypted form, such as by preventing paging of the content of the virtual volatile memory to the persistent storage. In some examples, the virtualization management program (e.g., the hypervisor 108 or a container engine) can configure a virtual security processor (e.g., a vTPM) so that the virtual security processor is disabled from being able to persistently store keys.

If the virtual security processor were to be moved from a source electronic device to a destination electronic device and restarted, the keys for the virtual security processor would be lost since the keys are not persisted. The keys (and their corresponding key certificates) would have to be recreated for a restarted virtual security processor. Since values of the physical security processor are not available at the destination electronic device, it would not be possible to recreate valid keys and key certificates for the migrated virtual security processor. By preventing the migration of keys of virtual security processors to different electronic devices, unauthorized access of the keys can be prevented as a result of migration of the virtual security processors.

In accordance with some implementations of the present disclosure, the instantiating of a vTPM 112 is performed by a vTPM manager 114 in the electronic device 100. In some examples, the vTPM manager 114 can be included as part of the hypervisor 108. In other examples, the vTPM manager 114 can be part of a VM that has an elevated privilege in the electronic device 100. A VM with an elevated privilege refers to a VM that can perform tasks in the electronic device 100 that are protected against unauthorized access by other programs in the electronic device 100, such as the application programs 106 and guest OSes 104 in the VMs 102. In some examples, the hypervisor 108 can assign different privilege levels to different VMs. The VMs 102 can be executed at a lower privilege level than another VM executed at a higher privilege level.

The vTPM manager 114 is an example of a virtual security processor manager that is to instantiate a virtual security processor based on a physical security processor. The virtual security processor manager can be part of a virtualization management program (e.g., a hypervisor, a container engine, etc.), or alternatively, the virtual security processor manager may be part of a virtualized computing environment such as a VM or a container.

The vTPM manager 114 has access to the pTPM 110. In examples according to FIG. 1, the pTPM 110 includes a storage key (SK) 122, which is stored in a secure memory 120 of the pTPM 110. The secure memory 120 of the pTPM 110 is protected to prevent unauthorized access of the security memory 120 by unauthorized entities. The vTPM manager 114 is an example of an authorized entity that is able to access information stored in the secure memory 120.

According to TPM 2.0, an SK is a key that is used to provide integrity and confidentiality protection for descendent keys that may be stored off of the pTPM 110. More generally, the SK 122 is an example of a root key of the pTPM 110 from which other keys can be derived. A "descendent" key refers to a key that is produced based on another key, such as the SK 122.

The vTPM manager 114 is able to instantiate a vTPM 112 in response to an instantiation command from the hypervisor 108. For example, when the hypervisor 108 creates a VM 102, the hypervisor 108 may issue an instantiation command to the vTPM manager 114 to instantiate a vTPM 112 for use by the VM 102 that is being created.

Figure 2:
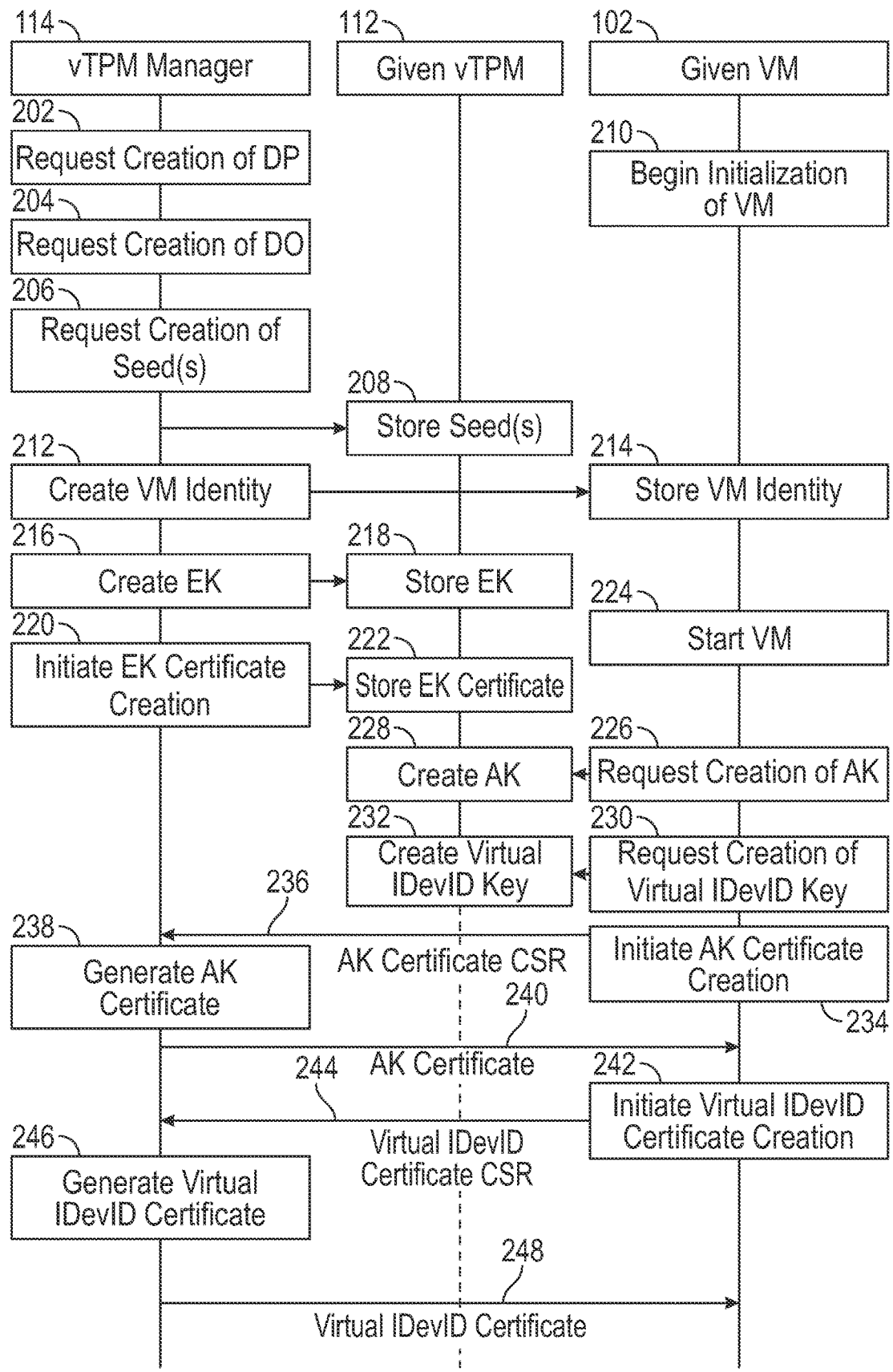
FIG. 2 is a flow diagram of a process of generating vTPM keys and key certificates, according to some examples.

The following discussion refers to both FIG. 1 and FIG. 2. FIG. 2 is a flow diagram of a process of generating example keys 134 and corresponding key certificates 136 for a given vTPM 112 that is associated with a given VM 102. Although FIG. 2 depicts a specific order of tasks, in other examples, a different order of tasks can be used, some of the tasks may be omitted, and other tasks may be added. In the example of FIG. 2, reference is made to using various TPM 2.0 commands from a TPM library 116 in FIG. 1 to create keys and key certificates. In other examples, other techniques (including using commands from other interfaces) may be employed to create keys and key certificates. The TPM library 116 is an interface including a collection of TPM-related commands according to TPM 2.0 that can be invoked by entities in the electronic device 100 to perform TPM-related tasks.

In some examples of the present disclosure, in response to the instantiation command, the vTPM manager 114 requests creation (at 202) of a derivation parent (DP) 124 using the SK 122 in the pTPM 110.

The DP 124 is a parent key from which other keys are derived. In some examples, the DP 124 includes a TPM_ALG_KEYEDHASH Parent Key, which is according to TPM 2.0. For example, the TPM_ALG_KEYEDHASH Parent Key may be created using a TPM2_CREATE command of the TPM library 116.

To create the DP 124, the vTPM manager 114 invokes the TPM2_CREATE command that is issued from the vTPM manager 114 to the pTPM 110, which provides the SK 122 as an input to the TPM2_CREATE command. There may be one DP 124 per VM 102, or one DP 124 may be shared by multiple VMs. The execution of the TPM2_CREATE command at the pTPM 110 causes creation of the DP 124 at the pTPM 110. The created DP 124 may be stored in the secure memory 120 of the pTPM 110.

After creating the DP 124, the vTPM manager 114 can request creation (at 204) of a derived object (DO) 126 based on the DP 124. In some examples, the DO 126 is a pseudorandom number generated by a pseudorandom number generator using the DP 124 as a seed to the pseudorandom number generator. The DO 126 is also stored in the secure memory 120 of the pTPM 110. The DO 126 is a child of the DP 124. There may be one DO per vTPM 112, or one DO may be shared across multiple vTPMs 112.

In some examples, the DO 126 can be created using the TPM2_CreateLoaded command that is part of the TPM library 116. Generally, the TPM2_CreateLoaded command allows for the creation of any type of object, including a derived object. More specifically, the TPM2_CreateLoaded command is provided with a parent handle that references the DP 124 to cause the creation of the DO 126 based on the DP 124 at the pTPM 110. A "handle" includes information that refers to an object. A "parent handle" is a reference to a parent object. The purpose of creating the DO 126 is so that a seed 132 can be created for the given vTPM 112 that is to be instantiated by the vTPM manager 114.

Although some examples of the present disclosure refer to use of the SK 122, the DP 124 generated based on the SK 122, and the DO 126 generated based on the DP 124, in other examples, any other parent key (or other value) of the pTPM 110 can be used to generate the seed 132 for the given vTPM 112.

A "seed" for a vTPM (or any other type of virtual security processor) refers to a starting value that is input to the vTPM (or any other type of virtual security processor) for use in deriving further keys (and key certificates) of the vTPM (or any other type of virtual security processor). In some examples, a seed is a hash value (discussed further below). In other examples, a seed can be a random value or any other value.

According to TPM 2.0, three control domain hierarchies may be employed, including an endorsement hierarchy, a platform hierarchy, and a storage hierarchy. The different control domain hierarchies are used for different purposes. The endorsement hierarchy is used for privacy-sensitive operations. The platform hierarchy is used by specific machine-readable instructions of the electronic device 100, such as boot firmware. The storage hierarchy is used by an owner of the electronic device 100, which can be a user of the electronic device 100 or an enterprise that owns various electronic devices including the electronic device 100.

Although reference is made to an endorsement hierarchy, a platform hierarchy, and a storage hierarchy, it is noted that in other examples, a virtual security processor includes just one collection of keys and key certificates, rather than multiple collections of keys and key certificates for different control domain hierarchies.

Based on the DO 126, the vTPM manager 114 can request creation (at 206) of the seed 132 (or multiple seeds) for the given vTPM 112 being initialized. In examples where there are multiple control domain hierarchies (e.g., the endorsement hierarchy, the platform hierarchy, and the storage hierarchy), three different seeds are produced for the multiple control domain hierarchies. The seed for the endorsement hierarchy is referred to as an endorsement primary seed (EPS), the seed for the platform hierarchy is referred to as a platform primary seed (PPS), and the seed for the storage hierarchy is referred to as a storage primary seed (SPS).

The vTPM 112 stores (at 208) of the seed 132 (or multiple seeds) in a memory 130 (a virtual memory) of the given vTPM 112. In some examples, the creation of the seed 132 uses the TPM2_HMAC command of the TPM library 116. The TPM2_HMAC command when invoked by the vTPM manager 114 is supplied with one or more input values, which include a handle to the DO 126 for the given vTPM 112 that is to be instantiated. Other input values that may be provided to the TPM2_HMAC command can include identifiers, such as universally unique identifiers (UUIDs), of the given vTPM 112 and the given VM 102 that is associated with the vTPM 112.

The TPM2_HMAC command when invoked causes performance of a hash-based message authentication code (HMAC) operation on the one or more input values. The HMAC operation applies a cryptographic hash function that produces a hash value from the one or more input values. The hash value produced by the HMAC operation is the seed 132. The seed 132 is thus a hash value based on the DO 126 and possibly other input values.

Based on the seed 132, additional keys 134 and respective key certificates 136 (that correspond to the keys 134) can be generated for the given vTPM 112. A key certificate for a given key can be produced using a certificate authority (CA) 140 in FIG. 1, which may be outside of or inside the electronic device 100. More specifically, the vTPM manager 114 can interact with the CA 140 to generate the key certificate from the given key. The CA 140 is a trusted entity that can verify the authenticity of the key certificate. Note that in examples where there are multiple control domain hierarchies, different collections of keys and key certificates would be generated from respective seeds for the corresponding control domain hierarchies.

Note that the keys derived from a seed of a control domain hierarchy are referred to as primary keys.

The creation of the keys 134 and key certificates 136 is based on the seed 132. In examples where there are multiple seeds for respective different control domain hierarchies, each seed is loaded into a corresponding control domain hierarchy of the given vTPM 112 and a respective collection of keys and key certificates are generated for the control domain hierarchy.

In the ensuing discussion, it is assumed that the keys and key certificates are created for the endorsement hierarchy. In further examples, similar techniques can be applied to generate keys and key certificates for the platform hierarchy and the storage hierarchy.

The given VM 102 begins initialization (at 210) when triggered by the hypervisor 108 (e.g., in response to an initialization command from the hypervisor 108). To initialize the given VM 102, the vTPM manager 114 creates (at 212) a VM identity (also referred to as a "VM name") for the given VM 102. In some examples, the VM identity can include a UUID or any other value that can uniquely identify the given VM 102. The vTPM manager 114 provides the VM identity to the given VM 102, which stores (at 214) the VM identity in a virtual memory of the given VM 102.

The vTPM manager 114 creates (at 216) an endorsement key (EK) for the given vTPM 112, such as by using a command from a software library, e.g., an OpenSSL (Secure Sockets Layer) library, that supports key generation. The vTPM manager 114 provides the EK to the given vTPM 112, which stores (at 218) the EK in the memory 130 of the given vTPM 112. The EK contained inside the given vTPM 112 is unique to the given vTPM 112 and can identify the given vTPM 112. Note that the EK includes the EK public key and the EK private key. The EK is stored in the memory 130 at a location accessible by commands in the TPM library 116 invoked by an application program 106 in the given VM 102. The commands invoked by the given VM 102 can cause the given vTPM 112 to perform security functions.

With a physical TPM such as the pTPM 110, an EK would be provisioned at the time of manufacture of the physical TPM and injected into the physical TPM. In some examples of the present disclosure, the virtual TPM manager acts as a virtual manufacturer for the given vTPM 112 and creates the EK that is injected into the given vTPM 112 at the time of virtual manufacture (instantiation) of the given vTPM 112.

The vTPM manager 114 initiates (at 220) a certificate creation process to create an EK certificate for the given vTPM 112 in cooperation with the CA 140 (which may be outside of or inside the electronic device 100). The EK certificate is associated with the EK, and the EK certificate indicates that the EK is from an authentic TPM (in this case an authentic vTPM). An example of initiating the certificate creation process includes the vTPM manager 114 invoking a command of an OpenSSL library.

The vTPM manager 114 provides the EK certificate to the given vTPM 112, which stores (at 222) the EK certificate in the memory 130 at a location that is accessible using commands from the TPM library 116. In some examples, the vTPM manager 114 may also store the EK certificate in a memory of the host (the electronic device 100).

At some point, the hypervisor 108 can start (at 224) the operation of the given VM 102. For example, the hypervisor 108 can start the given VM 102 after the hypervisor 108 receives an indication from the vTPM manager 114 that the seed(s), the EK, and the EK certificate have been stored in the given vTPM 112. In response to being started, the given VM 102 requests creation (at 226) of an attestation key (AK) (also referred to as a restricted key) at the given vTPM 112, such as by issuing a command of the TPM library 116 to the given vTPM 112.

In response to the command, the given vTPM 112 creates (at 228) the AK. As part of creating the AK, the given vTPM 112 returns a response to the given VM 102, where the response contains a handle that refers to the AK, and the AK public key. Note that the created AK includes the AK public key and the corresponding AK private key (the AK private key remains in the given vTPM 112 and is not exposed outside the given vTPM 112). The AK can be used to sign data of the given vTPM 112. For example, the AK can be used to certify that another key (such as a virtual device identity key discussed below) is held by the same TPM (in this case the given vTPM 112).

An example of the command to create the AK can be a TPM2_CreatePrimary command. An input to the command can include a handle that refers to a parent key (e.g., the EK) to indicate which control domain hierarchy the LDevID key is part of. The TPM2_CreatePrimary command uses the seed 132 to create the AK. Another input to the command can include attributes of the AK. In some examples, a template of the TPM library 116 can be used in creating the AK. The template may define the properties of the AK.

The given vTPM 112 stores the AK in the memory 130, at a location accessible by commands in the TPM library 116 invoked by an application program 106 in the associated VM 102.

The given VM 102 requests creation (at 230) of a virtual initial device identity (IDevID) key (also referred to as a signing key or an unrestricted key) at the given vTPM 112, such as by using a command from the TPM library 116. The virtual IDevID key is an example of an identity key. A virtual IDevID key can be used for authentication purposes, such as authentication of the associated given VM 102 over a network. In response to the command to create the virtual IDevID key, the given vTPM 112 creates (at 232) the virtual IDevID. As part of creating the IDevID key, the given vTPM 112 returns a response to the given VM 102, where the response contains a handle (an example of a reference) that refers to the IDevID key, and the IDevID public key. Note that the created IDevID key includes the IDevID public key and the corresponding IDevID private key (the IDevID private key remains in the given vTPM 112 and is not exposed outside the given vTPM 112).

An example of the command to create the virtual IDevID key can be a TPM2_CreatePrimary command. An input to the command can include a handle that refers to a parent key to indicate which control domain hierarchy the LDevID key is part of. The TPM2_CreatePrimary command uses the seed 132 to create the signing key. Another input to the command can include attributes of the IDevID key. In some examples, a template of the TPM library 116 can be used in creating the virtual IDevID key. The template may define the properties of the virtual IDevID key.

The given vTPM 112 stores the virtual IDevID key in the memory 130, at a location accessible by commands in the TPM library 116 invoked by an application program 106 in the associated VM 102.

The given VM 102 initiates (at 234) a certificate creation process to create an AK certificate for the given vTPM 112 in cooperation with the CA 140. The AK certificate is associated with the AK, and the AK certificate indicates that the AK is from an authentic TPM (in this case an authentic vTPM). An example of initiating the certificate creation process includes the given VM 102 creating an AK certificate signing request (CSR), which the given VM 102 sends (at 236) to the vTPM manager 114. The AK certificate CSR includes the AK public key. In response to the AK certificate CSR, the vTPM manager 114 interacts with the CA 140 (which may be in the electronic device 100 or outside the electronic device 100) to generate (at 238) the AK certificate for the given VM 102. The vTPM manager 114 may sign the AK certificate CSR and send the signed AK certificate CSR to the CA 140, which causes the CA to generate the AK certificate. The vTPM manager 114 sends (at 240) the AK certificate generated by the CA 140 to the given VM 102, which stores the AK certificate in the virtual memory of the given VM 102.

The vTPM manager 114 initiates (at 242) a certificate creation process to create a virtual IDevID certificate for the given vTPM 112 in cooperation with the CA 140. The virtual IDevID certificate is associated with the virtual IDevID key, and the virtual IDevID certificate is signed by the CA 140 to assert that the virtual IDevID key held in the vTPM 112 is to be associated with the given VM 102 identified in the virtual IDevID certificate. An example of initiating the certificate creation process includes the given VM 102 creating an IDevID certificate CSR that contains the VM identity of the given VM 102 (which was provided by the vTPM manager 114 to the given VM 102). The IDevID certificate CSR includes the virtual IDevID public key.

The given VM 102 sends (at 244) the IDevID certificate CSR to the vTPM manager 114. In response to the IDevID certificate CSR, the vTPM manager 114 interacts with the CA 140 to generate (at 246) the virtual IDevID certificate for the given VM 102. The vTPM manager 114 may sign the IDevID certificate CSR and send the signed IDevID certificate CSR to the CA 140, which causes the CA 140 to generate the virtual IDevID certificate. The vTPM manager 114 sends (at 248) the virtual IDevID certificate generated by the CA 140 to the given VM 102, which stores the virtual IDevID certificate in the virtual memory of the given VM 102.

The virtual IDevID certificate is an identity certificate that includes the VM identity of the given VM 102 that is associated with the given vTPM 112. The VM identity can be assigned to the given VM 102 through the virtual IDevID certificate. The virtual IDevID certificate binds the virtual IDevID key and device information (the VM identity included in the virtual IDevID certificate) using a CA signature. The virtual IDevID certificate can be used for enrollment and authentication of the given VM 102, and can be used to identify the given VM 102 when the given VM 102 seeks to connect to a service.

Note that the virtual IDevID certificate for the given VM 102 differs from an actual (non-virtual) IDevID certificate that would typically be provisioned for a physical platform (e.g., the electronic device 100) at the time of manufacture of the physical platform. However, since the given VM 102 is a virtual entity that may not exist at the time of manufacture of the electronic device 100, the FIG. 2 process enables the creation of an IDevID certificate (i.e., the virtual IDevID certificate) for the given VM 102.

Note that the EK, the AK, and the virtual IDevID key of the given vTPM 112 are bound to the DO 126 of the pTPM 110 (or more generally, to a specific value in the pTPM 110). As a result, if the given vTPM 112 were to be migrated to a different electronic device (different from the electronic device 100 that includes the pTPM 110), the EK, the AK, and the virtual IDevID key cannot be created in the different electronic device that does not have the pTPM 110 with the specific value.

As noted above, the virtual IDevID certificate asserts that the virtual IDevID key held in the vTPM 112 is to be associated with the given VM 102 identified in the virtual IDevID certificate. Since the VM identity of the given VM 102 is in the virtual IDevID certificate that in turn is based on the seed 132 generated from the DO 126 (or other specific value) of the pTPM 110, the VM identity of the given VM 102 is bound to the pTPM 110.

After the creation of the AK, the virtual IDevID key, the AK certificate, and the virtual IDevID certificate, the given VM 102 can proceed with its normal operations, which are operations initiated by the guest OS 104 and/or the application program 106 of the given VM 102. Security operations of the given VM 102 may use the given vTPM 112.

Figure 3:
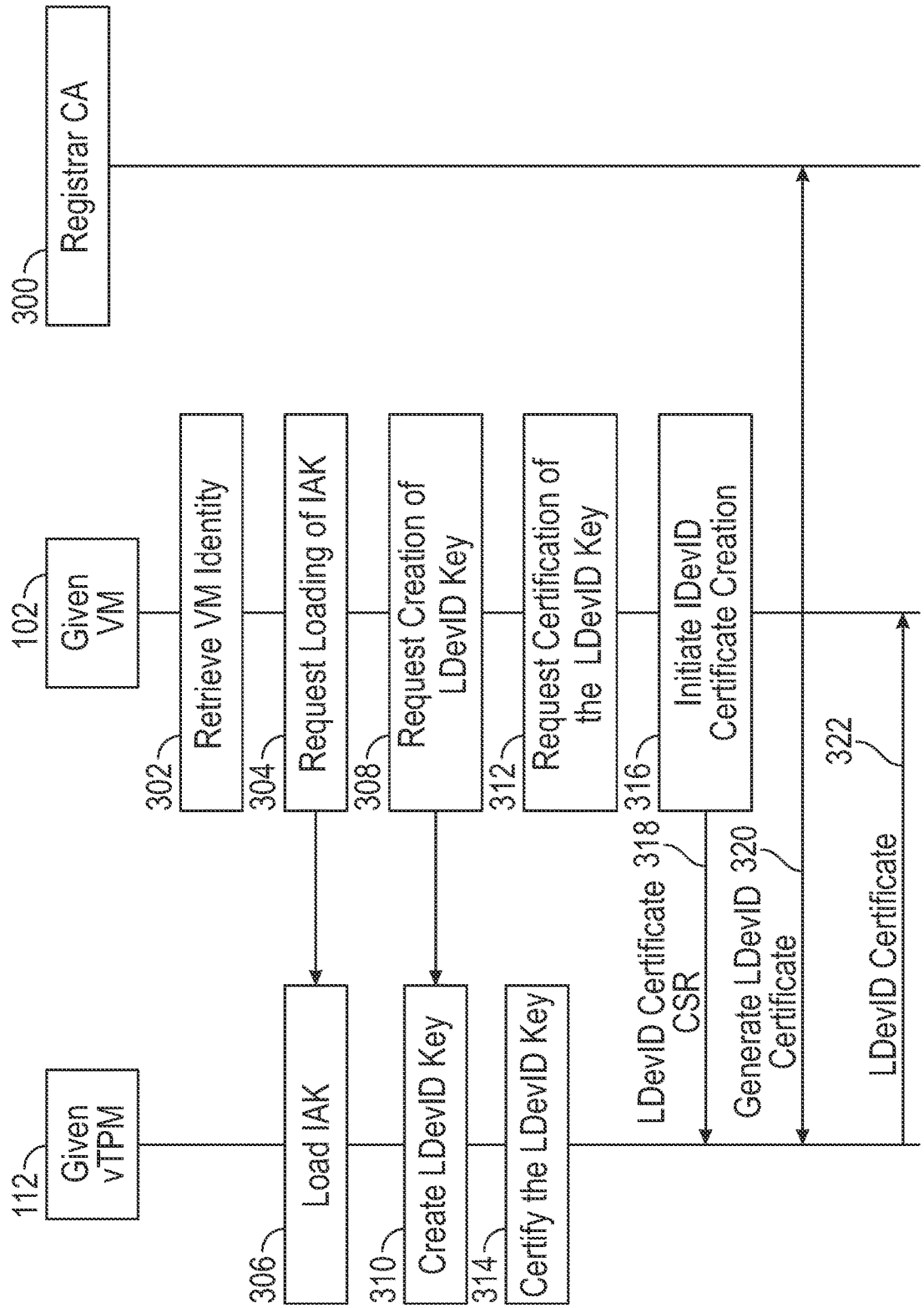
FIG. 3 is a flow diagram of a process of using a registrar certificate authority (CA) to generate a local device identity for a virtual machine (VM), according to some examples.

FIG. 3 is a flow diagram of a process of using a CA (referred to as a registrar CA 300) to generate a local device identifier (LDevID) certificate for a given VM 102. The registrar CA 300 may be the CA 140 of FIG. 1, for example. Although FIG. 3 depicts a specific order of tasks, in other examples, a different order of tasks can be used, some of the tasks may be omitted, and other tasks may be added. In the FIG. 3 process, it is assumed that tasks 202, 204, 206, 208, 210, 212, 214, 216, 218, 220, 222, 22, and 228 have already occurred, such that the seed 132 (or multiple seeds) has (have) been created for the given vTPM 112, the VM identity has been created for the given VM 102 and the VM identity has been stored in the given VM 102, the EK and the EK certificate have been created, and the AK and the AK certificate have been created.

Note that the LDevID certificate is different from the virtual IDevID certificate created in the FIG. 2 process. Since the given VM 102 is a virtual entity, an IDevID certificate is not provisioned at a time of manufacture of the electronic device 100 for the given VM 102. Without an IDevID certificate, there is no proof of identity for the given VM 102. With the FIG. 3 process, the LDevID certificate is created for the given VM 102 instead of the virtual IDevID certificate of FIG. 2. The created LDevID certificate enables an assignment of a VM identity to the given VM 102.

In FIG. 3, in response to starting the given VM 102 by the hypervisor 108, the given VM 102 retrieves (at 302) its VM identity, which was created by the vTPM manager 114 and stored in the given VM 102 (tasks 212 and 214 in FIG. 2). The given VM 102 requests a loading (at 304) of an initial AK (IAK), which is the AK created (at 228 in FIG. 2) by the vTPM 112. In response to the request to load the AK, the given vTPM 112 loads (at 306) the AK that was previously stored in the memory 130 of the vTPM 112. This results in retrieval of the AK by the vTPM 112 such that the AK can be used for later tasks.

The given VM 102 requests creation (at 308) of an LDevID key, such as by sending a command (e.g., a TPM2_CreatePrimary command) to the given vTPM 112 that is associated with the given VM 102. The LDevID key is an example of an identity key. An input to the command can include a handle that refers to a parent key to indicate which control domain hierarchy the LDevID key is part of. The TPM2_CreatePrimary command uses the seed 132 to create the LDevID key. Another input to the command can include attributes for the IDevID key. In response, the given vTPM 112 creates (at 310) the LDevID key. As part of creating the LDevID key, the given vTPM 112 returns a response to the given VM 102, where the response contains a handle that refers to the LDevID key, and the LDevID public key. Note that the created LDevID key includes the LDevID public key and the corresponding LDevID private key (the LDevID private key remains in the given vTPM 112 and is not exposed outside the given vTPM 112).

The given VM 102 requests certification (at 312) of the LDevID key, such as by sending a TPM2_Certify command of the TPM library 116 to the given vTPM 112. An input to the TPM2_Certify command is a handle to the LDevID key. In response, the given vTPM 112 certifies (at 314) the LDevID key using the AK (that was previously loaded at 306). The certification indicates that the LDevID key is loaded in the given vTPM 112.

The vTPM manager 114 initiates (at 316) a certificate creation process to create an LDevID certificate for the given vTPM 112 in cooperation with the registrar CA 300. The LDevID certificate is associated with the LDevID key, and the LDevID certificate is signed by the registrar CA 300 to assert that the LDevID key held in the vTPM 112 is to be associated with the given VM 102 identified in the LDevID certificate. An example of initiating the certificate creation process includes the given VM 102 creating an LDevID certificate CSR that contains the VM identity of the given VM 102 (which was provided by the vTPM manager 114 to the given VM 102). The given VM 102 sends (at 318) the LDevID certificate CSR to the vTPM manager 114. The LDevID CSR includes the LDevID public key In response to the LDevID certificate CSR, the vTPM manager 114 interacts with the CA 140 to generate (at 320) the LDevID certificate for the given VM 102. The vTPM manager 114 may sign the LDevID certificate CSR and send the signed LDevID certificate CSR to the registrar CA 300, which causes the registrar CA 300 to generate the LDevID certificate. The vTPM manager 114 sends (at 322) the LDevID certificate generated by the registrar CA 300 to the given VM 102, which stores the LDevID certificate in the virtual memory of the given VM 102.

The VM identity can be assigned to the given VM 102 through the LDevID certificate. The LDevID certificate binds the LDevID key and device information (the VM identity included in the LDevID certificate) using a CA signature. The LDevID certificate can be used for enrollment and authentication of the given VM 102, and can be used to identify the given VM 102 when the given VM 102 seeks to connect to a service.

As part of generating the LDevID certificate, the registrar CA 300 verifies the provided certification that the LDevID public key is to be contained in the same TPM (in this case the given vTPM 112) that contains an earlier created key certificate, such as the AK certificate created in the FIG. 2 process, and further that the LDevID certificate CSR is signed using the LDevID private key. The registrar CA 300 may perform other checks, such as confirming with the vTPM manager 114 or the hypervisor 108 that the identity to be included in the LDevID certificate matches the given VM 102 purportedly requesting the LDevID certificate.

When the checks performed by the registrar CA 300 pass, the registrar CA 300 signs the LDevID certificate with the CA's private key, and the registrar CA 300 sends the signed LDevID certificate to the given vTPM 112. The given vTPM 112 can extract the LDevID certificate from the signed LDevID certificate using the CA's public key.

Note that the VM identity of the given VM 102 is in the LDevID certificate that in turn is based on the LDevID key that is certified using the AK that was generated based on the seed 132, which in turn was generated from the DO 126 (or other specific value) of the pTPM 110. As a result, the VM identity of the given VM 102 in the LDevID certificate is bound to the pTPM 110.

After the creation of the LDevID key and the LDevID certificate, the given VM 102 can proceed with its normal operations, which are operations initiated by the guest OS 104 and/or the application program 106 of the given VM 102. Security operations of the given VM 102 may use the given vTPM 112.

In some examples, the LDevID certificate may also identify the hypervisor 108 and/or the host system (the electronic device 100) that hosts the virtual environment. The hypervisor identity can include a UUID of the hypervisor 108, for example. The host identity can include any unique identity available and appropriate to the virtual environment, such as the serial number of the electronic device 100, a host IDevID, a UUID of a host, or any other identity. The hypervisor identity and/or the host identity may be included as fields in the LDevID certificate. In this way, the registrar CA 300 binds the given VM 102 (and the associated vTPM 112) to the host. If the host identity is an IDevID, this binding may also be to the pTPM 110. The purpose of binding a virtual entity (e.g., the given VM 102) to its host is to allow the virtual entity to prove its identity and provenance when communicating to other entities.

Because the registrar CA 300 created the LDevID certificate, the registrar CA 300 can also revoke the LDevID certificate. As a result, the binding of the vTPM to the host system (and its pTPM) can be severed by the registrar CA 300 should the electronic device 100, the hypervisor 108, a vTPM 112, or a VM 102 become compromised or decommissioned. Absent any compromise, the host system is in control of the vTPM data (keys and key certificates), so that the vTPM data can be deleted (or even re-wrapped for migration) if the VM (or vTPM) is destroyed or migrated, respectively.

Techniques or mechanisms according to some examples of the present disclosure, including those discussed above in connection with FIGS. 1-3, enable a secure and repeatable method of initializing a vTPM using data bound to the pTPM 110, such that the data (including keys and key certificates of the vTPM) bound to the pTPM are secure when stored. In addition, a vTPM has no access to values (including the SK 122, the DP 124, and the DO 126) stored in the pTPM 110, so the values of the pTPM 110 are protected and cannot be moved to another electronic device (different from the electronic device 100). Control of primary keys (e.g., the EK, the AK, and the virtual IDevID key) of a vTPM is retained by the hypervisor 108. In this way, a VM can invoke security functions of a vTPM that is in a secure state. In other words, by reducing the likelihood of the vTPM being compromised, security functions of the vTPM invoked by the VM are also not compromised.

In some examples, a VM 102 may be able to request a change of the seed 132, such as any of the EPS, PPS, or SPS. The VM 102 may send the request to change the seed 132 to the associated vTPM 112. The vTPM manager 114 can monitor vTPM operations and perform related operations on the pTPM where appropriate. If the associated vTPM 112 receives a request from the VM 102 to change the seed 132, this request to change the seed 132 effectively is a cryptographic erasure of the seed 132. For the erasure of the seed 132 to be permanent (i.e., the current value of the seed 132 cannot be recreated), the vTPM manager 114 can cause deletion of the source of the seed 132 (e.g., the DO 126 on the pTPM). For example, the vTPM manager 114 can issue a command of the TPM library 116 that requests deletion of the DO 126.

In further examples, the vTPM manager 114 can monitor VM requests to an associated vTPM 112 to ensure that the VM 102 does not attempt to create a key matching characteristics of a key issued to the VM by the vTPM manager 114. This is to ensure that the VM 102 is not able to duplicate a key by recreating the key with different attributes or permissions. For example, if the VM 102 issues a TPM2_CreatePrimary command using a template (and included data that is part of a field of the template) matching templates used by the vTPM manager 114 in creating a key for the associated vTPM 112, such a command if detected by the vTPM manager 114 would cause the vTPM manager 114 to prevent the associated vTPM 112 from executing the command.

In additional examples, renaming a VM 102 (by any entity) causes the vTPM manager issued key certificates to be revoked and deleted. The VM 102 has a VM identity that is expected to be included in a device identity certificate (e.g., the virtual IDevID certificate or the LDevID certificate discussed above). If the VM identity is changed, then the key certificates of the vTPM 112 associated with the VM 102 are no longer valid, so that the registrar CA can revoke the key certificates or the vTPM manager 114 can delete the key certificates, or both.

Figure 4:
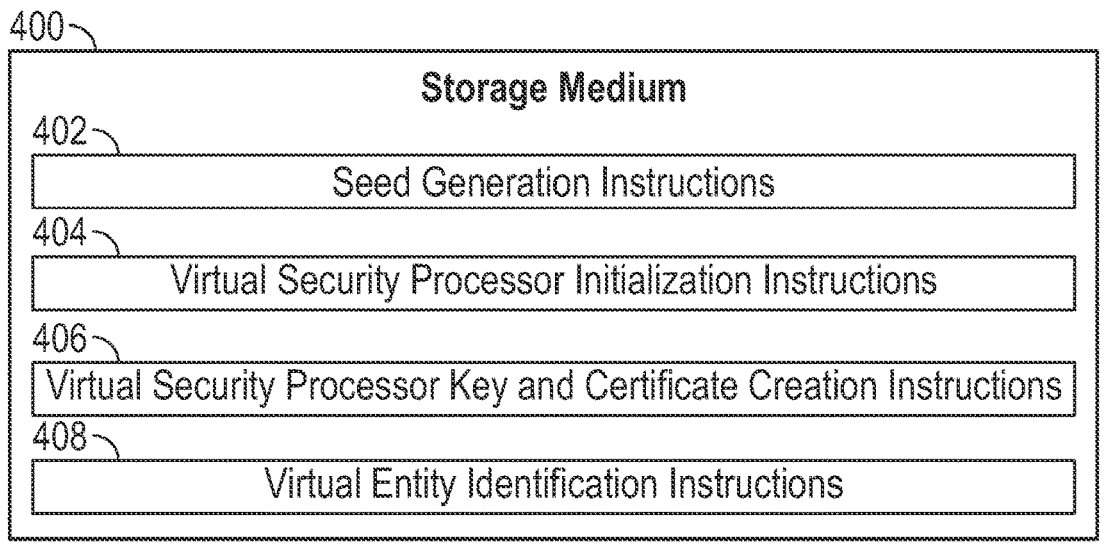
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause an electronic device to perform various tasks.

The machine-readable instructions include seed generation instructions 402 to generate, by a virtual manager in the electronic device, a seed based on a first key stored in a physical security processor of the electronic device. The virtual manager may be a virtual security processor manager such as the vTPM manager 114 of FIG. 1. The physical security processor may be the pTPM 110 of FIG. 1. The first key may be the SK 122 of FIG. 1. Generating the seed based on the first key may refer generating the seed directly from the first key. Alternatively, generating the seed based on the first key may refer to indirectly generating the seed from the first key, such as by deriving the DP 124 from the SK 122, then deriving the DO 126 from the DP 124, then generating the seed based on the DO 126.

The machine-readable instructions include virtual security processor initialization instructions 404 to initialize, by the virtual manager, a virtual security processor by providing, from the virtual manager, the seed to the virtual security processor. For example, the virtual security processor may be a vTPM 112 of FIG. 1. The seed may be loaded by the virtual manager into a memory of the virtual security processor (e.g., the memory 130 of the vTPM 112).

The machine-readable instructions include virtual security processor key and certificate creation instructions 406 to create, using the virtual security processor, a virtual security processor key based on the seed, and a virtual security processor certificate based on the virtual security processor key. The virtual security processor key is bound to the physical security processor based on the virtual security processor key being generated from the first key stored in the physical security processor. For example, the virtual security processor key may be a virtual IDevID key or an LDevID key, and the virtual security processor certificate may be a virtual IDevID certificate or an LDevID certificate. In some examples, the creation of the virtual security processor certificate uses a CA, such as the CA 140 of FIG. 1 or the registrar CA 300 of FIG. 3.

The machine-readable instructions include virtual entity identification instructions 408 to use the virtual security processor certificate for identifying a virtual entity in the electronic device, the virtual security processor certificate including an identity of the virtual entity a virtual entity in the electronic device. The identity of the virtual entity in the virtual security processor certificate may include a VM identity or an identity of a container.

In some examples, the initializing of the virtual security processor further includes creating a further virtual security processor key (e.g., an EK), generating a further virtual security processor certificate (e.g., an EK certificate) based on the further virtual security processor key, and providing the further virtual security processor key and the further virtual security processor certificate to the virtual security processor. The further virtual first virtual security processor key is to prove that the virtual security processor is authentic.

In some examples, the virtual security processor key includes a signing key (e.g., a virtual IDevID key) for the virtual entity, and the virtual security processor certificate comprises a virtual identity certificate (e.g., virtual IDevID certificate) created using the signing key. The identity of the virtual entity is included in the virtual identity certificate.

In some examples, binding the virtual security processor key to the physical security processor prevents a migration of the virtual security processor key from the electronic device to a different electronic device.

In some examples, the virtual manager is separate from the virtual entity.

In some examples, the virtual manager generates a parent key (e.g., the DP 124 of FIG. 1) for the virtual entity from the first key of the physical security processor, and the virtual manager generates a derived object (e.g., DO 126 in FIG. 1) based on the parent key. The seed is based on the derived object.

In some examples, the generating of the derived object includes generating a pseudorandom number from the parent key.

In some examples, the virtual manager is part of a hypervisor or a container engine.

In some examples, the machine-readable instructions store the virtual security processor key in a volatile memory of the virtual security processor such that the virtual security processor key is to be recreated upon a restart of the virtual security processor.

In some examples, the virtual security processor key is an identity key. The virtual entity issues a certificate request (e.g., a CSR) to the virtual security processor, which signs the certificate request. The virtual security processor sends the signed certificate request to a CA (e.g., the registrar CA 300 of FIG. 3), where the certificate request includes the identity key produced by the virtual security processor. For example, the identity key includes an LDevID key. The virtual security processor receives a local identity certificate (e.g., an LDevID certificate) as a response to the signed certificate request. The obtaining of the identity of the virtual entity includes generating the identity of the virtual entity using the local identity certificate. In some examples, virtual entity uses the local identity key certificate for identifying the virtual entity or a group that the virtual entity is a member of.

In some examples, creating the identity key is performed by the virtual security processor responsive to a request from the virtual entity.

In some examples, the virtual manager monitors a command issued by the virtual entity to the virtual security processor to change the seed. Based on detecting the command, the virtual manager causes deletion of a parent object from which the seed is derived, the parent object stored in the physical security processor.

In some examples, the virtual manager monitors a command issued by the virtual entity to the virtual security processor to create a key, and the virtual manager prevents the command from using a template that matches a template used by the virtual manager in creating the virtual processor key.

Figure 5:
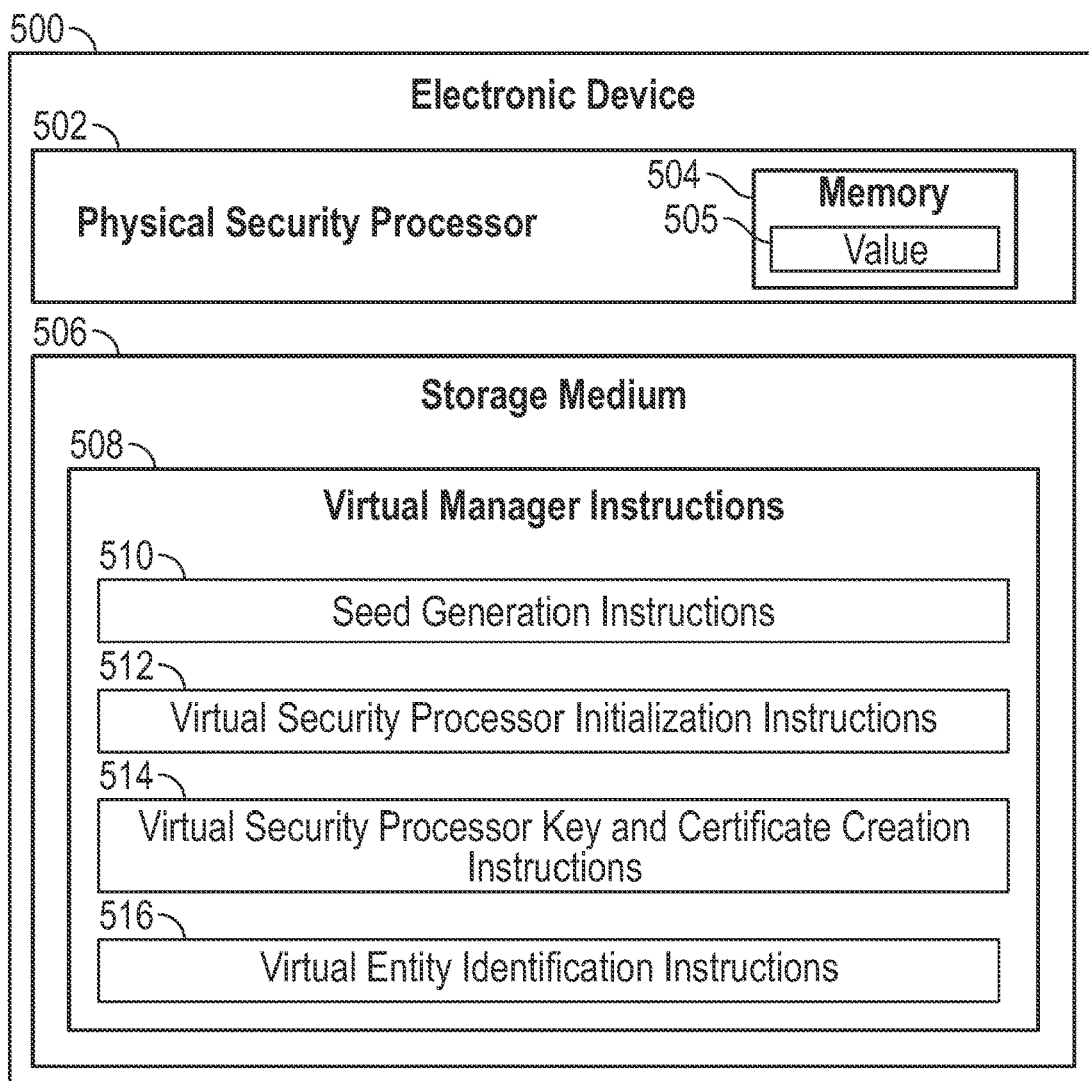
FIG. 5 is a block diagram of an electronic device according to some examples.

FIG. 5 is a block diagram of an electronic device 500 according to some examples. The electronic device 500 includes a physical security processor 502 that includes a memory 504 to store a value 505. An example of the physical security processor 502 is a pTPM, and an example of the value 505 includes any or some combination of the SK 122, the DP 124, and the DO 126 of FIG. 1.

The electronic device 500 includes a storage medium 506 storing machine-readable instructions 508 of a virtual manager. The instructions 508 when executed causing a processing resource of the electronic device 500 to perform various tasks. The processing resource of the electronic device 500 can include one or more hardware processors. A hardware processor can include a microprocessor, a core of a multi-core microprocessor, a microcontroller, a programmable integrated circuit, a programmable gate array, or another hardware processing circuit.

The machine-readable instructions 508 include seed generation instructions 510 to generate, by the virtual manager, a seed based on the value 505 stored in the physical security processor 502. The seed can be the seed 132 of FIG. 1, for example.

The machine-readable instructions 508 include virtual security processor initialization instructions 512 to initialize, by the virtual manager, a virtual security processor executed in the electronic device by providing, from the virtual manager, the seed to the virtual security processor, creating a first virtual security processor key, creating a first virtual security processor certificate based on the first virtual security processor key, and providing the first virtual security processor key and the first virtual security processor certificate to the virtual security processor.

The machine-readable instructions 508 include virtual security processor key and certificate creation instructions 514 to create a second virtual security processor key based on the seed, and an identity certificate based on the second virtual security processor key. The second virtual security processor key is bound to the physical security processor 502 based on the second virtual security processor key being generated from the value 505 stored in the physical security processor 502.

The machine-readable instructions 508 include virtual entity identification instructions 516 to use the identity certificate for identifying a virtual entity in the electronic device, the identity certificate comprising an identity of the virtual entity. The identity certificate can be a virtual IDevID certificate or an LDevID certificate.

Figure 6:
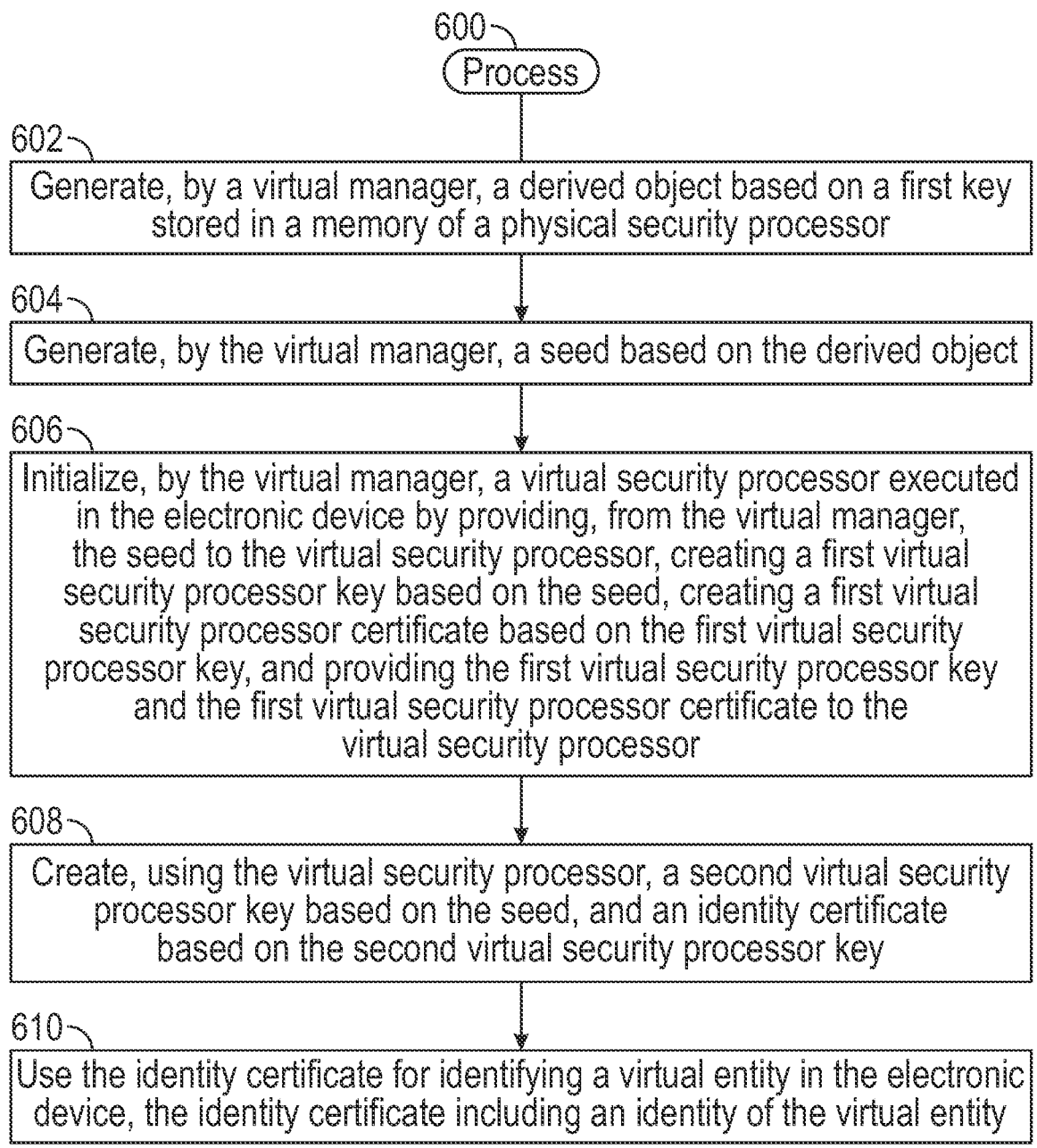
FIG. 6 is a flow diagram of a process according to some examples.

FIG. 6 is a flow diagram of a process 600 according to some examples of the present disclosure.

The process 600 includes generating (at 602), by a virtual manager, a derived object based on a first key stored in a memory of a physical security processor. The first key may be the SK 122 of FIG. 1, for example. The derived object may be the DO 126 of FIG. 1, for example, which may be generated from the DP 124 that is in turn generated from the SK 122.

The process 600 includes generating (at 604), by the virtual manager, a seed based on the derived object. The seed may be a hash value based on applying a cryptographic hash function on the derived object and possibly other inputs.

The process 600 includes initializing (at 606), by the virtual manager, a virtual security processor executed in the electronic device by providing, from the virtual manager, the seed to the virtual security processor, creating a first virtual security processor key based on the seed, creating a first virtual security processor certificate based on the first virtual security processor key, and providing the first virtual security processor key and the first virtual security processor certificate to the virtual security processor.

The process 600 includes creating (at 608), using the virtual security processor, a second virtual security processor key based on the seed, and an identity certificate based on the second virtual security processor key. The second virtual security processor key is bound to the physical security processor based on the second virtual security processor key being generated from the first key stored in the physical security processor.

The process 600 includes using (at 610) the identity certificate for identifying a virtual entity in the electronic device, the identity certificate including an identity of the virtual entity. The identity certificate may be a virtual IDevID certificate or an LDevID certificate.

A storage medium (e.g., 400 in FIG. 4 or 506 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause an electronic device to:
generate, by a virtual manager in the electronic device, a seed based on a first key stored in a physical security processor of the electronic device;
initialize, by the virtual manager, a virtual security processor executed in the electronic device by providing, from the virtual manager, the seed to the virtual security processor;
create, using the virtual security processor, a virtual security processor key based on the seed, and a virtual security processor certificate based on the virtual security processor key, wherein the virtual security processor key is bound to the physical security processor based on the virtual security processor key being generated from the first key stored in the physical security processor; and
use the virtual security processor certificate for identifying a virtual entity in the electronic device, the virtual security processor certificate comprising an identity of the virtual entity.

2. The non-transitory machine-readable storage medium of claim 1, wherein the instructions upon execution cause the electronic device to:
initialize, by the virtual manager, the virtual security processor further by creating a further virtual security processor key, generating a further virtual security processor certificate based on the further virtual security processor key, and providing the further virtual security processor key and the further virtual security processor certificate to the virtual security processor,
wherein the further virtual security processor key is to prove that the virtual security processor is authentic.

3. The non-transitory machine-readable storage medium of claim 1, wherein the virtual security processor key comprises a signing key for the virtual entity, and the virtual security processor certificate comprises a virtual identity certificate created using the signing key, and wherein the identity of the virtual entity is included in the virtual identity certificate.

4. The non-transitory machine-readable storage medium of claim 3, wherein the creating of the virtual identity certificate uses a certificate authority (CA).

5. The non-transitory machine-readable storage medium of claim 3, wherein the virtual identity certificate comprises a virtual IDevID certificate.

6. The non-transitory machine-readable storage medium of claim 1, wherein binding the virtual security processor key to the physical security processor prevents a migration of the virtual security processor key from the electronic device to a different electronic device.

7. The non-transitory machine-readable storage medium of claim 6, wherein the instructions upon execution cause the electronic device to:
generate, by the virtual manager, a parent key for the virtual entity from the first key of the physical security processor; and
generate, by the virtual manager, a derived object based on the parent key,
wherein the seed is based on the derived object.

8. The non-transitory machine-readable storage medium of claim 7, wherein the generating of the derived object comprises generating a pseudorandom number from the parent key.

9. The non-transitory machine-readable storage medium of claim 1, wherein the virtual manager is part of a hypervisor or a container engine.

10. The non-transitory machine-readable storage medium of claim 1, wherein the instructions upon execution cause the electronic device to:
store the virtual security processor key in a volatile memory of the virtual security processor such that the virtual security processor key is to be recreated upon a restart of the virtual security processor.

11. The non-transitory machine-readable storage medium of claim 1, wherein the virtual security processor key is an identity key, and the instructions upon execution cause the electronic device to:
issue, from the virtual entity, a certificate request to the virtual security processor;
sign, by the virtual security processor, the certificate request;
send the signed certificate request to a certificate authority (CA), the signed certificate request comprising the identity key produced by the virtual security processor; and
receive, at the virtual security processor, a local identity certificate as a response to the signed certificate request.

12. The non-transitory machine-readable storage medium of claim 11, wherein the creating of the identity key is performed by the virtual security processor responsive to a request from the virtual entity.

13. The non-transitory machine-readable storage medium of claim 11, wherein the instructions upon execution cause the electronic device to:
use, by the virtual entity, the local identity certificate for identifying the virtual entity or a group that the virtual entity is a member of.

14. The non-transitory machine-readable storage medium of claim 1, wherein the physical security processor is a physical trusted platform module (TPM), and the virtual security processor is a virtual TPM.

15. The non-transitory machine-readable storage medium of claim 1, wherein the instructions upon execution cause the electronic device to:
monitor, by the virtual manager, a command issued by the virtual entity to the virtual security processor to change the seed; and
based on detecting the command, cause deletion, by the virtual manager, of a parent object from which the seed is derived, the parent object stored in the physical security processor.

16. The non-transitory machine-readable storage medium of claim 1, wherein the instructions upon execution cause the electronic device to:
monitor, by the virtual manager, a command issued by the virtual entity to the virtual security processor to create a key; and
prevent, by the virtual manager, the command from using a template and included data that matches a template used by the virtual manager in creating the virtual processor key.

17. An electronic device comprising:
a physical security processor comprising a memory to store a value;

a non-transitory storage medium comprising instructions of a virtual manager, the instructions when executed causing the electronic device to:
  generate, by the virtual manager, a seed based on the value stored in the physical security processor;
  initialize, by the virtual manager, a virtual security processor executed in the electronic device by providing, from the virtual manager, the seed to the virtual security processor, creating a first virtual security processor key, creating a first virtual security processor certificate based on the first virtual security processor key, and providing the first virtual security processor key and the first virtual security processor certificate to the virtual security processor;
  create, using the virtual security processor, a second virtual security processor key based on the seed, and an identity certificate based on the second virtual security processor key, wherein the second virtual security processor key is bound to the physical security processor based on the second virtual security processor key being generated from the value stored in the physical security processor; and
  use the identity certificate for identifying a virtual entity in the electronic device, the identity certificate comprising an identity of the virtual entity.

18. The electronic device of claim 17, wherein the identity certificate comprises a virtual initial device identity (IDevID) certificate or a local device identity (LDevID) certificate.

19. A method comprising:
  generating, by a virtual manager executed in an electronic device, a derived object based on a first key stored in a memory of a physical security processor;
  generating, by the virtual manager, a seed based on the derived object;
  initializing, by the virtual manager, a virtual security processor executed in the electronic device by providing, by the virtual manager, the seed to the virtual security processor, creating a first virtual security processor key based on the seed, creating a first virtual security processor certificate based on the first virtual security processor key, and providing the first virtual security processor key and the first virtual security processor certificate to the virtual security processor;
  creating, using the virtual security processor, a second virtual security processor key based on the seed, and an identity certificate based on the second virtual security processor key, wherein the second virtual security processor key is bound to the physical security processor based on the second virtual security processor key being generated from the first key stored in the physical security processor; and
  use the identity certificate for identifying a virtual entity in the electronic device, the identity certificate comprising an identity of the virtual entity.

20. The method of claim 19, further comprising:
  monitoring, by the virtual manager, a command issued by the virtual entity to the virtual security processor to change the seed; and
  based on detecting the command, causing deletion, by the virtual manager, of the derived object from the physical security processor.

* * * * *